Jan. 12, 1926. 1,569,462
R. D. DIVINE
APPARATUS FOR AND PROCESS OF RECLAIMING AND CONVERTING ASPHALTUM
AND OTHER MATERIALS FROM WASTE MATERIAL
Filed Jan. 18, 1924

Patented Jan. 12, 1926.

1,569,462

UNITED STATES PATENT OFFICE.

RICHARD D. DIVINE, OF CHICAGO. ILLINOIS.

APPARATUS FOR AND PROCESS OF RECLAIMING AND CONVERTING ASPHALTUM AND OTHER MATERIALS FROM WASTE MATERIAL.

Application filed January 18, 1924. Serial No. 687,128.

*To all whom it may concern:*

Be it known that I, RICHARD D. DIVINE, a citizen of the United States, and a resident of Chicago, Cook County, and State of Illinois, have invented certain new and useful Improvements in Apparatus for and Processes of Reclaiming and Converting Asphaltum and Other Materials from Waste Material, of which the following is declared to be a full, clear, and exact description.

This invention relates to apparatus for and process of reclaiming and converting asphaltum and other carbonaceous materials from waste materials, and its principal object is to provide an apparatus containing a retort in which the waste material is placed, and in which it is subjected to heat, sufficient to melt the fusible reclaimed materials, thereby liberating carbon laden gases, from which lamp black or carbon black is collected. Another object is to provide, in such an apparatus, means for collecting the melted material and delivering the same in very small quantities, as, for instance, a drop at a time, upon a hot surface in a substantially closed chamber, whereby carbon laden gas is liberated (because of incomplete combustion) from which lamp black or carbon black may be separated.

The invention has been designed particularly for use in reclaiming roofing paper or composition roofing which employs asphaltum or the like in its composition. There is considerable waste roofing material to be found in old buildings and there is considerable scrap roofing material which is not capable of being used. This waste material contains asphaltum or other bituminous material and grit, both of which are valuable substances in the preparation of new roofing material, and at the present time, are regarded as waste materials, having practically no value. One of the objects of the present invention is to reduce waste roofing material and reclaim therefrom the asphaltum, or other bitumen, grit and carbon and simultaneously to convert part of the asphaltum or bitumen into lamp black or carbon black which is a valuable product. Another object is to provide a substantial and practical apparatus which may be operated by unskilled persons and which requires no special attention except to fill the retort and remove the reclaimed material. The invention consists in the several novel features and process hereinafter fully set forth and claimed.

Figure 1:
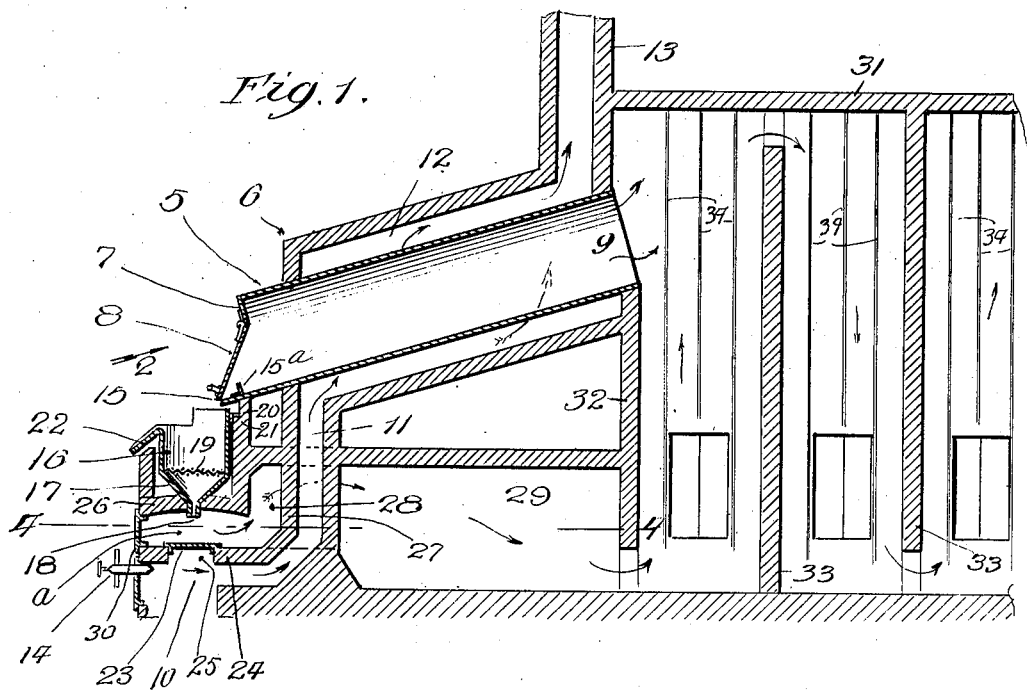
Figure 2:
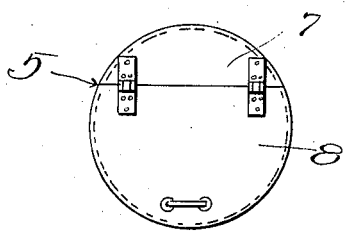
Figure 3:
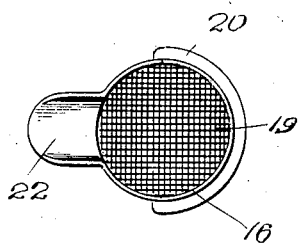
Figure 4:
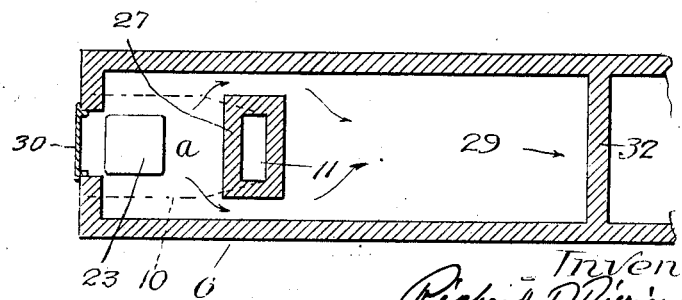

The invention is clearly illustrated in the accompanying drawing, in which:

Fig. 1 is a vertical, longitudinal section through an apparatus embodying a simple form of the invention; Fig. 2 is an end view of the retort which comprises part of said apparatus, the view being taken in the direction of the arrow 2, in Fig. 1; Fig. 3 is a plan of a certain receptacle used in the apparatus, and Fig. 4 is a horizontal section taken on the line 4—4 of Fig. 1.

Referring to said drawing, the reference character 5 designates a retort which may be in the form of a cylinder, preferably supported in an inclined position in a furnace or other heating apparatus 6. The front end of the retort is closed by a door or cover 8 hinged to the front wall 7 and arranged to be opened for access to the retort. The discharge end 9 of the retort is open to permit the gases to escape at said discharge end. A ridge or dam 15$^a$ at the lower end is provided to arrest the escape of the grit.

Below the retort is a combustion chamber 10 from which leads a flue 11, for the escape of the products of combustion and said flue opens into a heating chamber 12 in which the retort 5 is contained, and from said chamber 12 leads a stack or flue 13 for the escape of the products of combustion.

The heat may be supplied by any suitable fuel, and in the drawing I have shown a burner 14 in which hydrocarbons or gas may be used as fuel. Said burner discharges the burning gases into the combustion chamber 10, and the products of combustion pass up through the flue, 11, thence into the chamber 12 around the retort 5, finally escaping into and out of the stack or flue 13.

Below the discharge end 15 of the retort is a receptacle 16 into which the liquefied or melted material is discharged from the retort, and in its preferred form said receptacle 16 has a funnel shaped bottom 17 which terminates in a restricted discharge orifice 18. Within the receptacle 16 is a horizontal screen 19 of fine mesh, through which the liquid may pass, but which intercepts any grit or other fine particles that may be discharged from the retort. Said receptacle 16 is secured below the discharge end of the retort in any suitable manner and as shown is provided with a flange 20 near its upper end that rests upon a wall 21, located at the front of the furnace 6. The receptacle 16 may be provided with a spout 22 for discharging the overflow of liquid in case the receptacle becomes filled. Said receptacle may be removably secured whereby it may be removed from the apparatus for the purpose of discharging its contents into vats or other containers and for the purpose of removing the collected grit and other fine material.

The restricted discharge orifice 18 of the receptacle 16 is located above the combustion chamber 10 and a plate 23 is interposed between said discharge orifice 18 and combustion chamber 10, which plate may rest upon the upper wall or roof 24 of the combustion chamber and as a preference an opening 25 is left in said upper wall or roof 24 which is covered by the plate 23, whereby the plate may be exposed directly to the influence of the burning fuel in the combustion chamber. During the operation of the apparatus said plate is heated to a high degree of temperature and the liquefied asphaltum or other mobile substance which enters the receptacle 16, drops upon said hot plate, where carbon particles and gas are liberated due to incomplete combustion in the chamber, which carbon particles and gas are subsequently discharged into certain collecting chambers where the lamp black or carbon black is deposited and the gases escape. Above the upper wall or roof 24 is a chamber $a$, above which an arch or wall 26 from which rises the wall 21, and between said wall 21 and a wall 27, of the flue 11, is a passage 28 that leads from the chamber $a$, to a passage 29 located below the chamber 12. The discharge end of the receptacle 16 may project through the wall 26 and terminate directly above the hot plate 23. The forward end of the chamber $a$ is closed by a door or other cover 30.

At the rear of the furnace and chamber portions 12, 29 is a closed structure 31 for collecting the carbon particles and gas that escape from the retort 5, and from the chamber $a$, and said structure contains the usual partitions 32, 33 around which pass the gases which carry the carbon particles. The alternate partitions have openings or passages at their lower ends and the intermediate partitions have openings or passages at upper ends whereby a tortuous passageway is formed in said structure 31, as is customary in structures for the production of lamp black or carbon black. Curtains 34 are usually hung in the tortuous passages and usually a small air vent (not shown) is provided at the rear end of the structure 31, otherwise no air is admitted thereto, which is in accordance with the ordinary practice of producing lamp black.

In the process of reducing and reclaiming waste materials with the use of this apparatus, the wast material, such as roofing material or other materials containing volatile or fusible substance is placed in the retort and subjected to the heat from the burner 14. In accordance with the preferred practice a comparatively low temperature is maintained in the retort, approximately from 400 to 600 degrees having proven most satisfactory to obtain the best results. When the asphaltum or other volatile or fusible substance contained in the waste material melts it flows down the inclined bottom of the retort and discharges into the receptacle 16, passes through the screen 19 and discharges from the restricted orifice 18 in small quantities, practically a drop at a time. The drops of asphaltum fall upon the hot plate 23 where they are rapidly disintegrated and carbon particles and gases are liberated which escape through the passages 28, 29 and into the tortuous passage of the collection structure 31, where the gases deposit the lamp black or carbon black. Some of the carbon particles and gases are liberated from the materials contained in the retort and are discharged through the discharge end 9 of the retort into the tortuous passage of the collection structure 31 and the gases deposit the lamp black or carbon black therein. Roofing material usually contains grit or other fine particles which is caught by the ridge or dam 15$^a$. Some of said grit may pass over the ridge and discharge into the receptacle 16 where it is intercepted by the screen 19.

The discharge orifice 18 of the receptacle 16 is restricted in size so that only part of the liquid material that enters the receptacle 16, may escape through said orifice and the remainder may fill the receptacle and overflow the discharge spout 22. However, in case the receptacle 16, is made removable it may be lifted away from the apparatus and its contents discharged into vats or other containers.

From the above it is evident that practically all of the waste material may be converted into useful materials and that when waste material such as roofing containing asphaltum and grit is reduced, such products as asphaltum, lamp black or carbon black, grit and a small amount of carbon is produced, all of which have a market value and may be used over again in the production of any roofing material containing asphaltum and grit. The lamp black has its uses and is a readily saleable commodity.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. An apparatus for reclaiming and converting waste material comprising a retort having a liquid discharge end and a gas discharge end, means for heating said retort, a chamber into which the liquid is discharged, a hot plate in said chamber, upon which the liquid drops and a lamp black collection chamber communicating with the gas discharge end of the retort and with said chamber into which the liquid drops.

2. An apparatus for reclaiming and converting waste material comprising a retort having a liquid discharge end and gas discharge end, means for heating said retort, a receptacle into which said retort discharges liquid, said receptacle having a restricted discharge orifice, a chamber into which said liquid is discharged, a hot plate in said chamber, upon which said liquid drops and a lamp black collection chamber opening to said gas discharge end of the retort and to the chamber into which the liquid drops.

3. An apparatus for reclaiming and converting waste material comprising an inclined retort having a liquid discharge end and a gas discharge end, a furnace having a combustion chamber and having a heating chamber into which said retort is contained, a receptacle into which said retort discharges liquid, said receptacle having a restricted discharge orifice, a chamber into which said liquid is discharged, a hot plate in said chamber, upon which the liquid drops and a lamp black collection chamber opening to the gas discharge end of the retort and into the chamber into which the liquid drops.

4. An apparatus for reclaiming and converting waste material into lamp black comprising an inclined, open ended retort having a door for closing the lower end, a furnace having a combustion chamber and having a heating chamber in which said retort is contained, a receptacle into which said retort discharges liquid, said receptacle having a restricted discharge orifice, a chamber in which said liquid is discharged, a hot plate in said chamber, upon which the liquid is dropped and a collection chamber opening to said retort and to the chamber into which the liquid is dropped.

5. In an apparatus for reclaiming and converting material, an inclined retort having a liquid discharge end, means for heating said retort, a receptacle located below the discharge end of said retort, and having a funnel shaped bottom terminating in a restricted discharge orifice and having an overflow spout, a screen in said receptacle, a hot plate located below said discharge orifice, a closed collection chamber and a passage leading from said hot plate to said collection chamber.

6. The herein described process of reclaiming and converting waste material into lamp black which consists in melting fusible material from the waste material, collecting in a closed chamber, carbon particles carried by the gases which escape from the waste material, releasing the fused material in small quantities upon a hot plate and separating the carbon particles from the gases which are liberated from the fused material.

7. The herein described process of reclaiming and converting waste material containing bitumen into lamp black, which consists in heating the waste material in a retort until the bitumen is melted therefrom, collecting the liquid bitumen and releasing the liquid in small quantities at a time upon a hot surface and separating the carbon particles from the gases which escape from the waste material and which escape from the liquid bitumen which is dropped upon the hot surface and collecting said carbon particles in a closed collection chamber.

RICHARD D. DIVINE.